United States Patent [19]

Takahashi

[11] Patent Number: 4,840,369

[45] Date of Patent: Jun. 20, 1989

[54] APPARATUS FOR CONVEYING SHEET MEMBER

[75] Inventor: Motoaki Takahashi, Kanagawa, Japan

[73] Assignee: Fuji Photo Film Co., Ltd., Kanagawa, Japan

[21] Appl. No.: 38,112

[22] Filed: Apr. 14, 1987

[30] Foreign Application Priority Data

Apr. 14, 1986 [JP] Japan ................................ 61-85251
Apr. 15, 1986 [JP] Japan ................................ 61-86497
Apr. 15, 1986 [JP] Japan ................................ 61-86498
Apr. 15, 1986 [JP] Japan ................................ 61-86499

[51] Int. Cl.⁴ ............................................. B65H 5/22
[52] U.S. Cl. .................................... 271/276; 271/94; 271/196
[58] Field of Search ...................... 271/196, 276, 94-96

[56] References Cited

U.S. PATENT DOCUMENTS 3,258,530  6/1966  Fowlie ............................ 271/196 X
3,669,446  6/1972  Derc ................................... 271/94
3,851,871 12/1974  Aronson .......................... 271/95 X
3,942,788  3/1976  Boyle ............................. 271/196 X Primary Examiner—Richard A. Schacher
Attorney, Agent, or Firm—Sughrue, Mion, Zinn, Macpeak and Seas

[57] ABSTRACT

An apparatus for conveying a sheet member by a conveyor roller having an axis perpendicular to the direction of convey of the sheet member, suitable for use in effecting a sub-scan by an electron beam over the surface of the sheet member. The apparatus has at least one suction roller constituting the conveyor roller and having a hollow cylindrical body and a multiplicity of suction holes formed in the wall of the cylindrical body; and an arrangement for allowing only selected suction holes to be exposed for the suction of the sheet material. The arrangement may include a chamber rotatably receiving the suction roller and communicating with a vacuum source, the chamber having a wall provided therein with at least one elongated slit through which the suction holes in a region parallel to the axis of the suction roller are exposed.

2 Claims, 6 Drawing Sheets

APPARATUS FOR CONVEYING SHEET MEMBER

BACKGROUND OF THE INVENTION

1. Field of the Invention:

The present invention relates to an apparatus for conveying a sheet by member by means of suction-type rollers. More particularly, the present invention is concerned with an apparatus which is capable of conveying a sheet member at a constant speed and with a high degree of precision and which is suitable for use in a system for scanning the sheet material by a light beam.

2. Description of the Prior Art:

Japanese Patent Laid-Open No. 33451/1984 discloses an apparatus for conveying a sheet member which is to be scanned by a light beam. This apparatus employs a porous endless belt and a suction box disposed inside the endless belt. The vacuum generated in the suction box is transmitted through the pores in the porous endless belt so as to attract the sheet member, whereby the sheet member is conveyed by the porous endless belt while keeping close contact with the latter. With this arrangement, therefore, it is possible to convey the sheet member at a constant speed and with a high degree of positional precision without any offset of the sheet member, while keeping a high degree of flatness of the sheet member surface to be scanned.

This apparatus also employs a detection means for detecting the leading end of the sheet member to be scanned, and the scanning system for scanning the surface of the sheet member is controlled in accordance with the output from this detection means, so that the whole area of the sheet member can be scanned or exposed correctly with high positional accuracy.

This known apparatus, however, suffers from the following disadvantages. Firstly, it is to be pointed out that the apparatus essentially requires an expensive and space-occupying suction system, as well as expensive crown pulleys for the endless belt. In addition, it is necessary to employ a motor having a large driving torque for driving the endless belt, considering that the load on the motor is largely varied depending on the positional relationship between the suction box and the sheet member carried by the endless belt.

Another known apparatus for conveying a sheet member to be scanned by a light beam employs a suction roller in place of the combination of the suction box and the endless belt mentioned above. In operation, the sheet member is sucked onto the suction roller and conveyed in accordance with the rotation of the suction roller. This known apparatus also encounters a problem in that, since the suction roller is hollow and provided with suction holes over the entire surface thereof, air is sucked also through the holes which are not covered by the sheet material on the suction roller, resulting in a wasteful use of the suction power and a low efficiency of the suction of the sheet member.

SUMMARY OF THE INVENTION

Accordingly, an object of the present invention is to provide an apparatus for conveying a sheet member suitable for conveying a sheet material to be scanned by a light beam, which has a simple construction and which is capable of accurately conveying the sheet member at a constant speed, thereby overcoming the above-described problems of the prior art.

Another object of the present invention is to provide an apparatus for conveying a sheet member precisely at a constant speed, thus allowing the sheet member to be scanned two-dimensionally with a high degree of accuracy.

In accordance with one form of the present invention, there is provided an apparatus for conveying a sheet member by a conveyor roller having an axis perpendicular to the direction of convey of the sheet member, suitable for use in effecting a sub-scan by an electron beam over the surface of the sheet member, the apparatus having at least one suction roller constituting the conveyor roller and having a hollow cylindrical body and a multiplicity of suction holes formed in the wall of the cylindrical body; and an arrangement for allowing only selected suction holes to be exposed for the suction of the sheet material. The arrangement may include a chamber rotatably receiving the suction roller and communicating with a vacuum source, the chamber having a wall provided therein with at least one elongated slit through which the suction holes in a region parallel to the axis of the suction roller are exposed.

DESCRIPTION OF THE PREFERRED EMBODIMENTS

Figure 1:
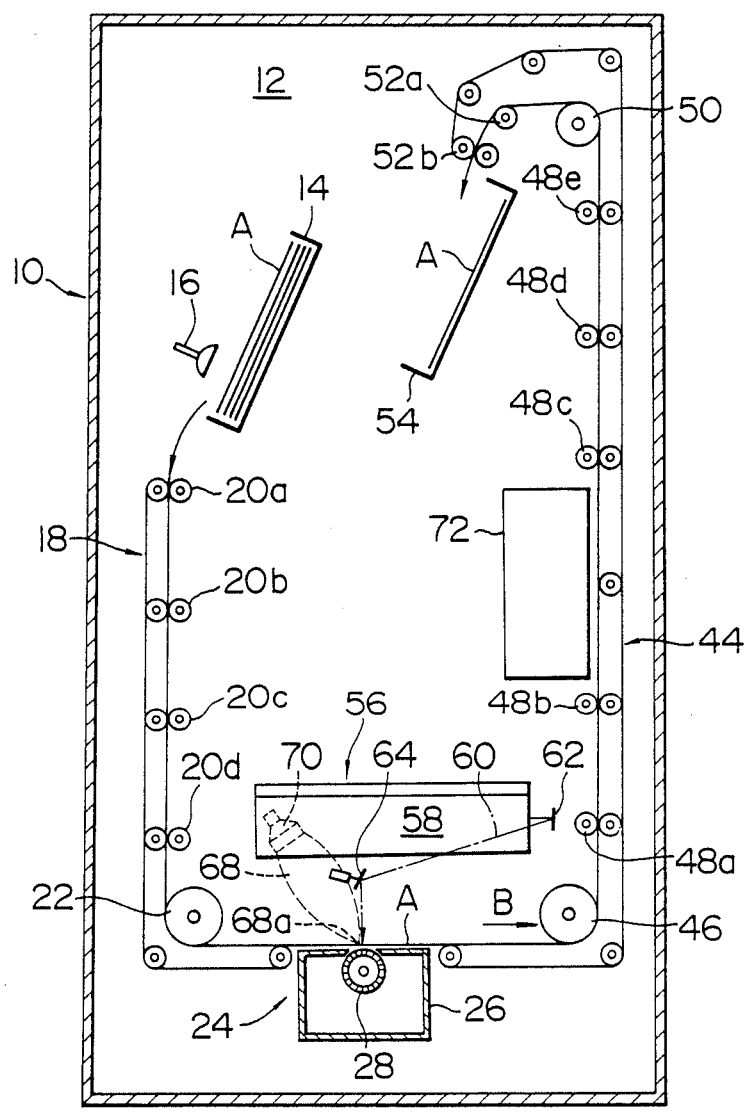
FIG. 1 shows an image reading apparatus incorporating a light-beam scanning unit which employs a first embodiment of a sheet material conveying apparatus in accordance with the present invention.

FIG. 1 shows a first embodiment of an image reading apparatus incorporating a light-beam scanning unit which employs a sheet material conveying apparatus in accordance with the present invention. This image reading apparatus is suitable for use in a system proposed by the same applicant in Japanese Patent Laid-Open Nos. 12429/1980 and 11395/1981 for recording and reproducing image data by radiation rays on a stimulable phosphor sheet.

The image reading apparatus generally designated by a numeral 10 has a chamber 12 in which is installed a supply magazine 14 which accommodates a stack of stimulable phosphor sheets A each carrying images formed by radiation rays. The chamber 12 also receives a sheet pickup mechanism including a suction plate 16 disposed in the vicinity of the supply magazine 14. A first conveyor belt 18 incorporating an endless belt for conveying the stimulable phosphor sheet A is disposed under the suction plate 16.

The first conveyor belt 18 extends vertically downwardly and turns to run horizontally at a corner portion of the image reading apparatus 10. A plurality of pairs of rollers 20a to 20d are arranged in the vertical direction so as to contact one side of the first conveyor belt 18. A roller 22 of a comparatively large diameter is disposed at the lower turning portion of the first conveyor belt 18. An apparatus embodying the present invention for conveying a sheet material (referred to as "sheet conveying apparatus", hereinafter), generally designated by a numeral 24, is disposed at a small distance from the terminal end of the first conveyor belt 18. The sheet conveying apparatus is intended for conveying the stimulable phosphor sheet A in the direction of sub-scan as will be explained later.

Figure 2:
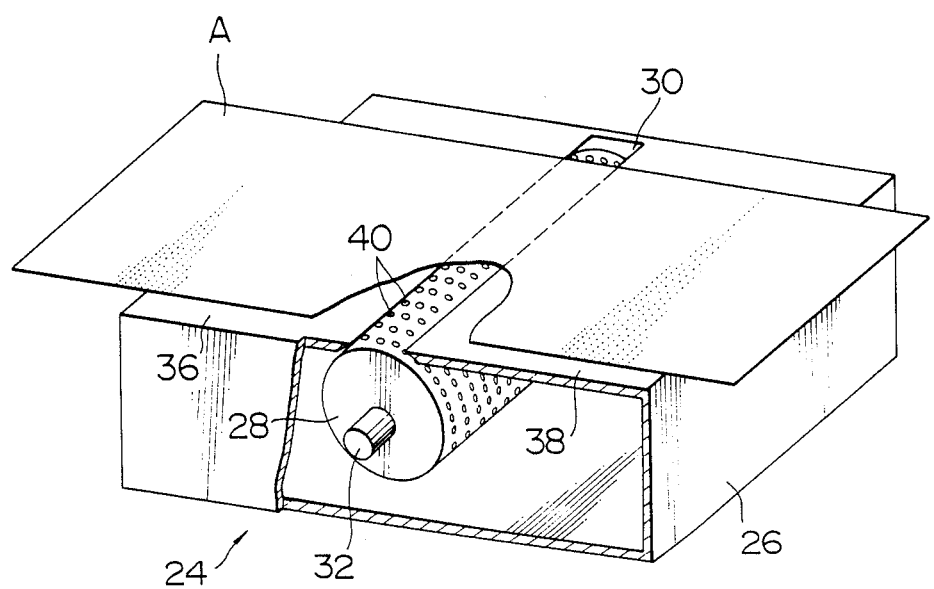
FIG. 2 is a perspective view of the sheet conveying apparatus incorporated.

As will be explained later, the sheet conveying apparatus 24 incorporates a suction chamber 26 accommodating a rotatable suction roller 28. The interior of the suction chamber 26 is communicated with a vacuum source (not shown). The top wall of the suction chamber 26, as shown in FIG. 2, is provided with a slit 30 through which the suction roller 28 is exposed. The suction roller 28 is provided at its both ends with journals 32 by which it is rotatably carried by opposing walls of the suction chamber 26.

The top wall of the suction chamber 26 presents an upstream guide 36 and a downstream guide 38 which are on the upstream side and downstream side of the slit 30 as viewed in the direction of conveying of the sheet A and adapted for guiding the sheet A moving on the surface of the top wall of the suction chamber 26. The arrangement is such that the planes of the upstream guide and the downstream guide 36 and 38 are flush with the uppermost surface of the suction roller 28 exposed through the slit 30. One of the journals 32 of the suction roller 28 is drivingly connected to a driving power source such as a motor (not shown) so as to be driven by the latter.

The suction roller 28 is constituted by a hollow cylinder having a multiplicity of suction holes 40 formed in the wall thereof. The arrangement is such that, when a vacuum is established in the suction chamber 26, ambient air is sucked through the suction holes 40 in the portion of the suction roller 28 exposed through the slit 30, so that these suction holes produce sucking effect.

A reading unit 56, as shown in FIG. 1, is disposed above the sheet conveying apparatus 24. The reading unit 56 includes a laser beam source 58, and a mirror 62 and the galvanometer 64 which are disposed on the beam-outlet side of the laser beam source 58 and adapted for causing a laser beam 60 to scan the surface of the sheet A.

An optical guide 68 is disposed above the region of the sheet A scanned by the laser beam 60. The optical guide 68 has an incident end 68a opposing the scanned region of the sheet. A photomultiplier 70 is mounted on the optical guide 68.

A second conveyor belt 44 constituted by an endless belt is disposed in the vicinity of the sheet conveying apparatus 24. The sheet conveying apparatus extends horizontally over a predetermined distance and then runs vertically upward. The end of the upward run of the second conveyor belt 44 extends horizontally over a predetermined distance and then turns downward slightly. A roller 46 of a comparatively large diameter is disposed at the lower turning point of the second conveyor belt 44, while a plurality of pairs of rollers 48a to 48e are arranged along the vertical run of the second conveyor belt 44.

A roller 50 of a comparatively large diameter is disposed at the upper turn of the second conveyor belt 44 and rollers 52a and 52b are disposed to direct the end of the second conveyor roll vertically downward so as to convey the sheet A vertically downward. A receive magazine 54 for receiving the stimulable phosphor sheets A is disposed in the vicinity of the rollers 52b.

An erasing unit 72 for relieving radiation ray energy remaining on the stimulable phosphor sheet A is disposed along the vertical run of the conveyor belt 44 at a portion between the roller pairs 48b and 48c. The erasing unit 72 has a plurality of erasing light sources (not shown).

The operation of this image recording and reproducing apparatus is as follows.

The supply magazine 14 is mounted in the image reading apparatus 10. The supply magazine 14 receives a stack of a plurality of stimulable phosphor sheets A each carrying an image of an object such as a portrait cumulatively formed thereon by radiation rays.

The stimulable phosphor sheets A are picked up one by one from the supply magazine 14 by the operation of the sheet pickup mechanism including suction plate 16, and is conveyed to the sheet conveying apparatus 24 through the first conveyor belt under the suction plate 16 via the rollers 20a to 20d past the roller 22.

Then, the suction apparatus communicated with the suction chamber 26 is started and the suction roller 28 starts to rotate, so that the stimulable phosphor sheet A is sucked by vacuum transmitted through the suction holes 40 in the suction roller 28 exposed through the slit 30 and is made to run in the direction of an arrow B at the same peripheral speed as the suction roller 28. Subsequently, the reading unit 56 is started so that the laser beam source 58 emits a laser beam 60 which is reflected by the mirror 62 and reaches the galvanometer mirror 64 so as to be deflected up and down as a result of an oscillatory motion of the galvanometer mirror 64 thereby scanning the surface of the sheet A. In consequence, a random light corresponding to the image data cumulatively stored in the sheet A is introduced to the optical guide 68.

The light from the stimulable phosphor sheet A is converted into an electric signal by means of the photomultiplier 70 and the thus obtained electric signal is delivered to, for example, a CRT display or an image recorder.

The stimulable phosphor sheet A which is being scanned by the laser beam 60 is held on the suction roller 28 by the suction force and is fed continuosly by the suction roller 28 in the direction of the arrow B, whereby the stimulable phosphor sheet is scanned two-dimensionally, thus allowing whole the recorded image data to be read.

The stimulable phosphor sheet A is then conveyed by the second conveyor belt 44 to the erasing unit 72 past the roller 46 and the roller pairs 48a, 48b. The erasing unit 72 has a plurality of light sources which are lit on so as to irradiate the stimulable phosphor sheet A thereby completely erasing the radiation ray images remaining on the sheet A. The stimulable phosphor sheet A after erasing of the image is then conveyed to an upper region of the image reading apparatus 10 by the second conveyor belt 44 past the rollers 48c to 48e.

The conveying direction of the sheet A is then changed by the roller 50 and the rollers 52a, 52b and is received in the receive magazine 54.

In the first embodiment of the sheet conveying apparatus, a single suction roller is disposed in the suction chamber 26 having a single slit 30. This, however, is not exclusive and it will be obvious to those skilled in the art that the sheet conveying apparatus of the invention can have a plurality of suction rollers which are exposed through corresponding slits formed in the top wall of the suction chamber.

Thus, the first embodiment of the sheet conveying apparatus in accordance with the present invention features at least one suction roller exposed through a corresponding slit formed in the top wall of a vacuum chamber. With this arrangement, it is possible to run a sheet member safely and accurately for the sub-scanning purpose, thus ensuring a high accuracy of sub-scan by a light beam.

A second embodiment of the present invention will be described with reference to FIGS. 3 and 4.

Figure 3:
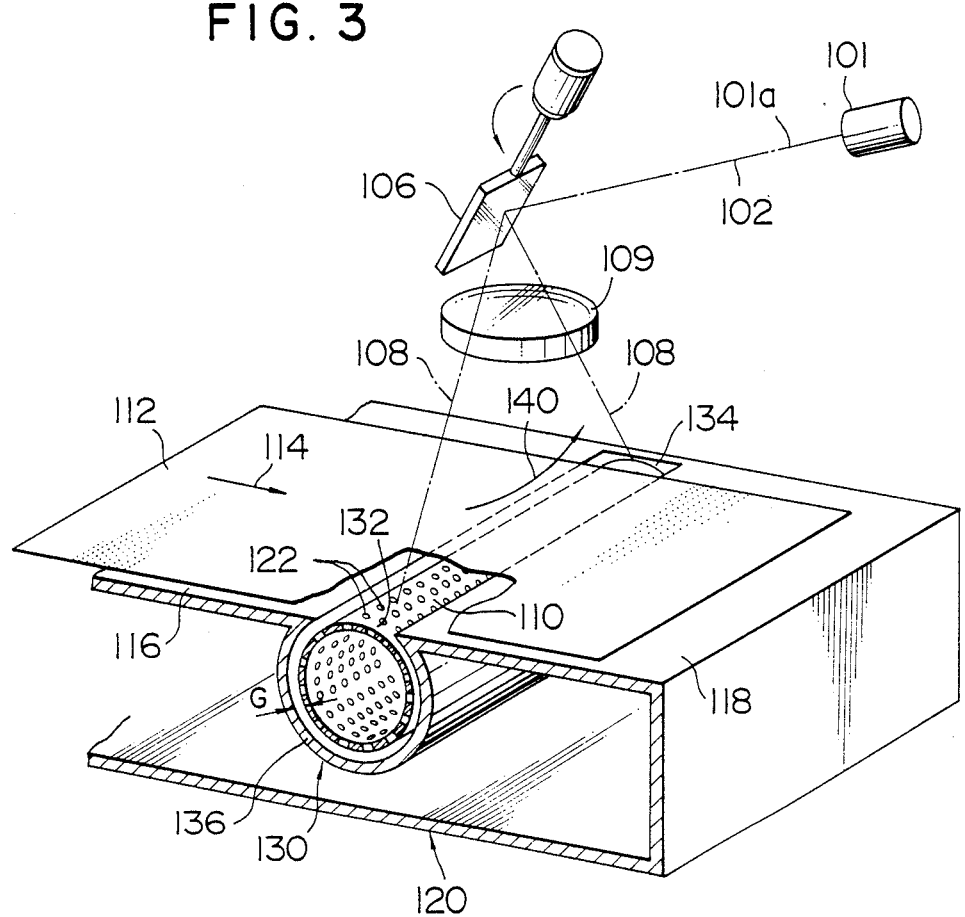
FIG. 3 is a schematic illustration of a beam scanning apparatus incorporating a second embodiment of the sheet conveying apparatus in accordance with the present invention.

FIG. 3 is a schematic illustration of a light beam scanning system incorporating the second embodiment of the sheet conveying apparatus in accordance with the present invention.

The scanning system includes a galvanometer mirror 106 serving as a light deflector and disposed in the path 102 of light beam 101a from the light source 101, and an fθ lens 109 disposed on the path 108 of the light reflected by the galvanometer mirror 106 and serving as a scanning lens.

The sheet conveying apparatus of the invention for effecting a sub-scan of a sheet by the light beam 101a is positioned at a point where the light beam 101a is converged by the fθ lens 109. The sheet conveying apparatus has a suction roller 110 rotatably mounted in a roller housing 130 on a frame 120 and adapted to be driven by a motor (not shown).

Figure 4:
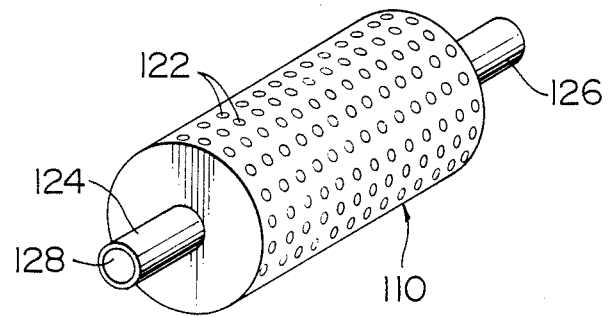
FIG. 4 is a perspective view of a suction roller of the second embodiment.

As shown in FIG. 4, the suction roller 110 is a hollow roller with a cylindrical wall having a multiplicity of suction holes 122 formed therein. The suction roller 110 has journals 124 and 126 on both ends thereof. One 124 of these journals is provided therein with a suction passage 128 communicating at its one end with the hollow in the suction roller 110 and at its other end with a vacuum pump (not shown). The suction roller 110 is rotatably supported at its journals 124 and 126.

The roller housing 130 has a slit 134 through which an upper portion 132 of the suction roller 110 is exposed so as to allow the suction roller 110 to attact and convey a sheet 112 to be scanned. The roller housing 130 also has a shielding portion 136 which covers the portion of the suction roller 110 other than the portion 132 exposed through the slit 134. Thus, the shielding portion serves to prevent air from being sucked through the suction holes 122 in the portion of the suction roller 110 which does not contribute to the attraction and convey of the sheet 112, thereby enhancing the suction force exerted by the portion of the suction roller which contributes to the attraction and convey of the sheet 112. Preferably, the clearance G between the shielding portion 136 and the suction roller 110 is determined to be about 1.0 mm. In the case that the suction roller diameter ranges between 20 and 25 mm, the clearance G is preferably not greater than 0.2 mm. The frame 120 provides an upstream guide 116 and a downstream guide 118 at portions thereof upstream and downstream of the roller housing 130. The upstream guide 116 and the downstream guide 118 are substantially flush with the attracting portion of the suction roller 110 so that they can guide the sheet 112 which the latter is being conveyed by the suction roller 110.

In operation, the suction roller 110 is driven by a known means, while the vacuum pump operates to establish a negative pressure in the suction roller 110, so that the air is sucked into the suction roller 110 through the suction holes 122 in the portion of the suction roller 110 exposed through the slit 134. As explained above, the suction holes 122 in the portion of the suction roller 110 convered by the shielding member 136 do not suck air because the shielding portion prevents air from flowing into these suction holes 122.

As the sheet 112 to be scanned is supplied to the sheet conveying apparatus in the direction of an arrow 114, the sheet 112 is caught by the suction force exerted through the suction holes 122 in the portions of the suction roller successively brought into the region defined by the slit 134 and is conveyed by the suction roller 110 at a speed which just coincides with the peripheral speed of the suction roller 110.

Meanwhile, the light source 101 emits a light beam 101a which oscillates in the direction of the arrow 140 as a result of oscillatory motion of the galvanometer mirror 106, thus scanning the portion of the sheet 112 on the slit 134.

As mentioned above, this embodiment features that the suction holes in the portion of the suction roll which does not contributes to the attraction and convey of the sheet are materially sealed by the shielding member, so that the suction efficiency is remarkably improved. This in turn enables the capacity of the vacuum pump to be reduced and the sheet to be conveyed with a higher degree of precision of speed control, as compared with known sheet conveying apparatus incorporating a suction roller.

Although this embodiment has been described as an apparatus for conveying a sheet to be scanned by a light beam, it will be obvious to those skilled in the art that this embodiment can equally be applied to various other types of systems or apparatus which require a sheet member to be conveyed with a high degree of precision.

A third embodiment of the sheet conveying apparatus in accordance with the present invention will be described hereinunder with reference to FIGS. 5 and 6.

Figure 5:
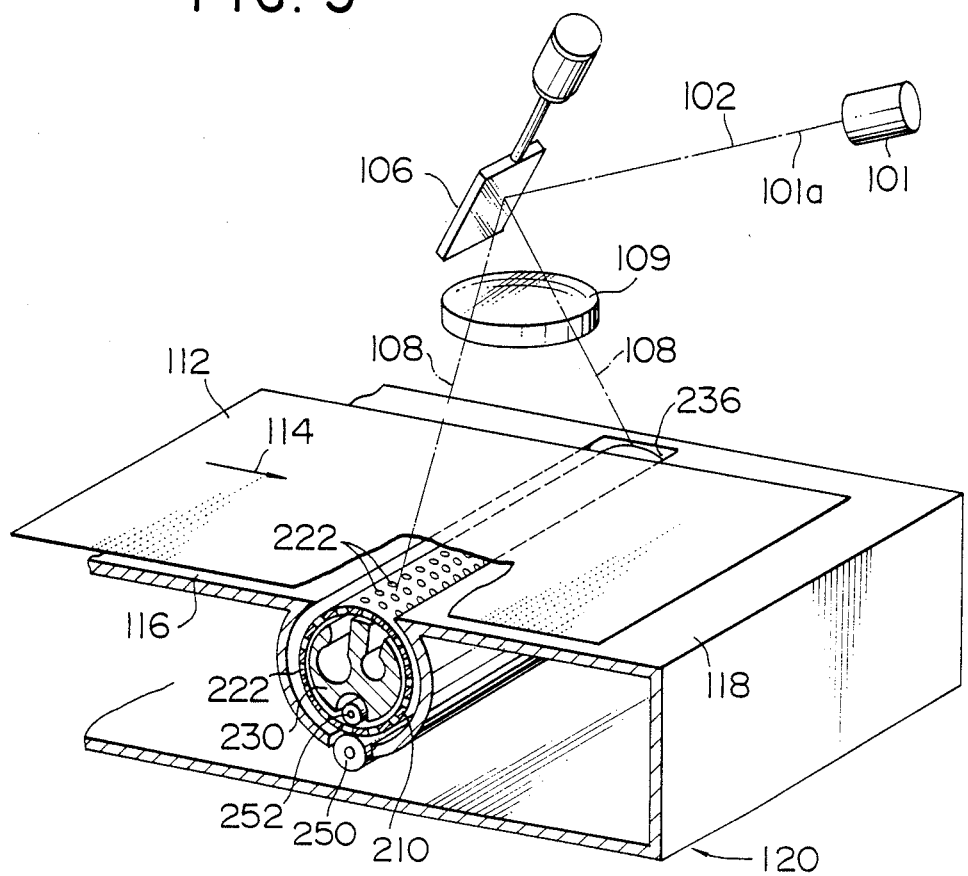
FIG. 5 is a schematic illustration of a beam scanning apparatus incorporating a third embodiment of the sheet conveying apparatus in accordance with the present invention.
Figure 6:
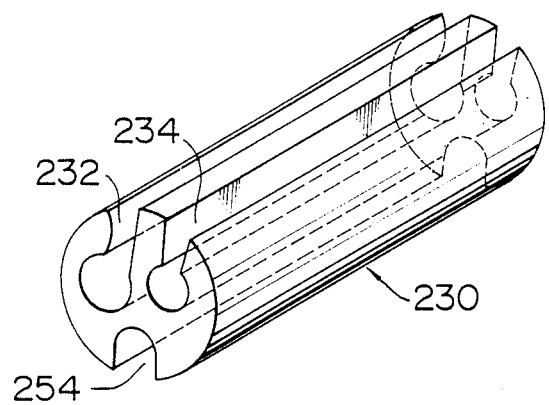
FIG. 6 is a perspective view of a stationary core of the third embodiment.

FIG. 5 schematically shows a light beam scanning system incorporating the third embodiment of the present invention.

The scanning system, in the same as the first embodiment, includes a galvanometer mirror 106 serving as a light deflector and disposed in the path 102 of light beam 101a from the light source 101, and an fθ lens 109 disposed on the path 108 of the light reflected by the galvanometer mirror 106 and serving as a scanning lens.

The sheet conveying apparatus of the invention for effecting a sub-scan of a sheet by the light beam 101a is positioned at a point where the light beam 101a is converged by the fθ lens 109. The sheet conveying apparatus has a suction roller 210 which is a power driven roller rotatably mounted on a frame 120 which is provided with an upstream guide 116 and a downstream guide 118 adapted for guiding a sheet 112 as a scanning object as the sheet 112 is moved in the direction of an arrow 114.

The suction roller 210 is a hollow cylindrical member having a multiplicity of air holes 222 formed in the cylindrical wall thereof. The suction roller 210 is clamped at its outer and inner surfaces by a drive roller 250 and an idle roller 252, respectively, so as to be power-driven by the drive roller 250.

A stationary core 230 having an outside diameter slightly smaller than the inside diameter of the suction roller 210 is disposed in the hollow of the suction roller 210. As shown in FIG. 6, the stationary core 230 is provided with three grooves extending in parallel with the axis of the suction roller 210: namely, a suction groove 232, a discharge groove 234 and a roller groove 254. The stationary core 230 is so oriented that the suction groove 232 and the discharge groove 234 are positioned in a slit 236 formed between the upstream guide 116 and the downstream guide 118, such that the grooves 232 and 234 are disposed on the upstream and downstream sides of each other as viewed in the direction of movement of the sheet 112. The suction groove 232 is communicated with a suction port of an air pump (not shown) through an air line (not shown), while the discharge groove 234 is communicated with a discharge port of the same air pump through another air line.

As the air pump is operated, a negative pressure and a positive pressure are established in the suction groove 232 and the discharge groove 234, respectively. In consequence, the holes 222 positioned to confront the suction produce suction effect, while the air holes 222 positioned to confront the discharge groove 234 produce repulsion effect.

The suction roller 210 is rotatingly driven by the drive roller 150. In consequence, the sheet 112 which is being conveyed in the direction of an arrow 114 is caught by the portion of the suction roller 210 facing the upstream portion of the slit 236 by the suction force so that it is conveyed at a speed which is the same as the peripheral speed of the suction roller 210 rotating clockwise. The portion of the sheet 112 on the downstream portion of the slit 236 is separated from the suction roller 210 by the air discharged through the air holes 222 facing the discharge groove 234 so that it is transferred to the downstream guide 118 without encountering any substantial resistance.

Meanwhile, the light beam 101a emitted from the light source 101 is oscillated as a result of oscillatory motion of the galvanometer mirror 106 so as to linearly scan the portion of the sheet 112 which is held by the vacuum suction force on the suction roller 210.

In this embodiment, the suction roller 210 is clamped between an outer drive roller 250 and an inner idle roller 252 so as to be driven by the drive roller 250. This driving arrangement, however, is not exclusive and the arrangement may be such that the suction roller is rotatably journaled at its both ends and driven directly by a motor or the like power source.

As understood from the foregoing description, this embodiment has a simple construction but yet is capable of holding the sheet by suction and positively separating the same in the region downstream from the suction region. With this arrangement, therefore, it is possible to eliminate troubles such as collision of the leading end of the sheet with the downstream guide disposed on the downstream side of the suction roller, which collision may otherwise occur because the sheet is firmly trapped on the surface of the suction roller by the suction force. Thus, the third embodiment described in connection with FIGS. 5 and 6 is suitable for conveying a sheet having a high degree of flexibility.

In addition, the suction and discharge of the air are conducted only through the air holes 222 which are exposed to the sheet through the slit, so that any unnecessary suction and discharge of air are avoided. In consequence, this embodiment enables a sheet member to be conveyed precisely at a desired speed by a small-sized air suction and discharge device.

Although this embodiment has been described as an apparatus for conveying a sheet to be scanned by a light beam, it will be obvious to those skilled in the art that this embodiment can equally be applied to various other types of systems or apparatus which require a sheet member to be conveyed with a high degree of precision.

A fourth embodiment of the sheet conveying apparatus of the present invention will be explained hereinunder with reference to FIGS. 7, 8 and 9.

Figure 7:
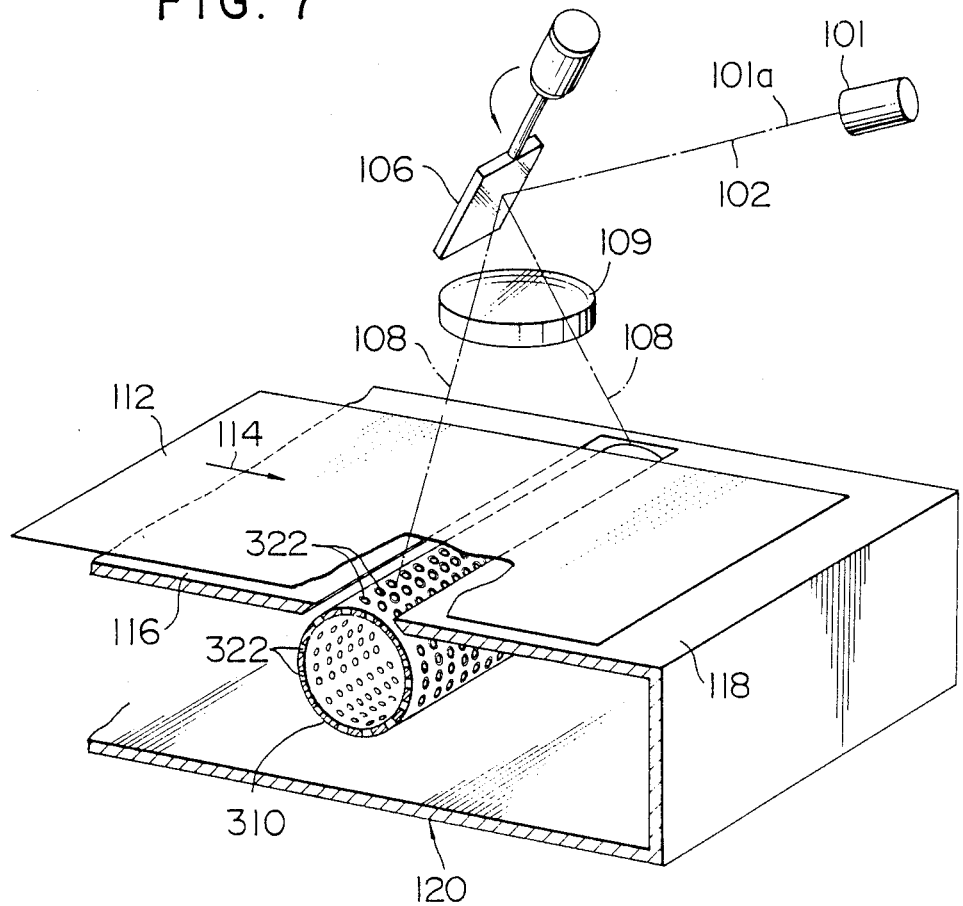
FIG. 7 is a schematic illustration of a beam scanning apparatus incorporating a fourth embodiment of the sheet conveying apparatus in accordance with the present invention.

FIG. 7 is a schematic illustration of a light beam scanning system incorporating the fourth embodiment of the sheet conveying apparatus in accordance with the present invention.

The scanning system, in the same as the first embodiment, includes a galvanometer mirror 106 serving as a light deflector and disposed in the path 102 of light beam 101a from the light source 101, and an fθ lens 109 disposed on the path 108 of the light reflected by the galvanometer mirror 106 and serving as a scanning lens.

The sheet conveying apparatus of the invention for effecting a sub-scan of a sheet by the light beam 101a is positioned at a point where the light beam 101a is converged by the fθ lens 109. The sheet conveying apparatus has a suction roller 310 which is rotatably mounted in a frame 120 having an upstream guide 116 and a downstream guide 118 for smoothly guiding the sheet 112 to be scanned in the direction of an arrow 114. The suction roller 310 is adapted to be rotated by a motor (not shown) or a similar means.

Figure 8:
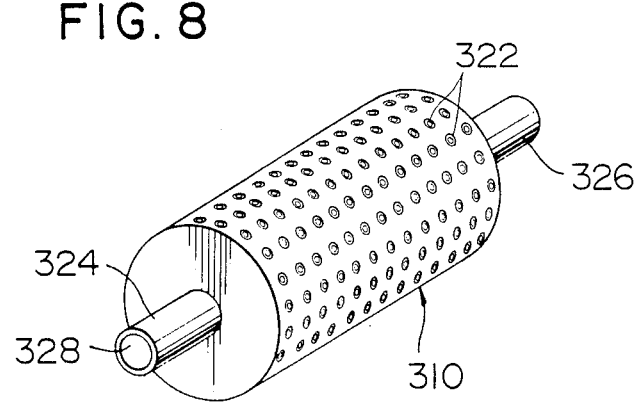
FIG. 8 is a perspective view of a suction roller of the fourth embodiment.

As seen from FIG. 8, the suction roller 310 is a hollow cylindrical member having a multiplicity of suction holes 322 formed in the cylindrical wall thereof, and is supported at journals 324, 326 projecting from both axial ends thereof. One 324 of these journals is provided therein with a suction passage 328 which communicates at its one end with the hollow in the suction roller and at its other end with a vacuum pump (not shown).

Figure 9:
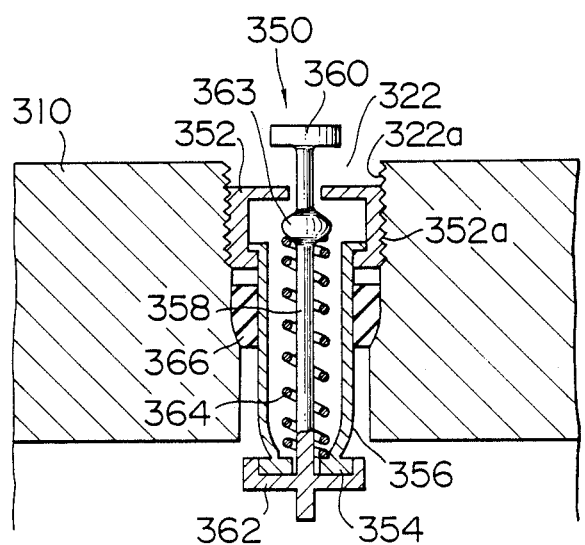
FIG. 9 is a sectional view of a valve of the fourth embodiment.

A valve unit 350 as shown in FIG. 9, is screwed into each of the suction holes 322 of the suction roller 110. The valve unit 350 has a cylindrical mounting member 352 provided with an external screw thread 352a for engagement with internal screw thread 322a formed in the wall of the suction hole 222. The valve unit 350 also has a hollow valve seat member 356 provided at its one end with a valve seat 354 and fitting in the mounting member 352. The valve unit 350 further has a stem member 358 extends through the cylindrical mounting member 352 and through the hollow valve seat member 356. One end of the stem member 358 projects beyond the peripheral surface of the suction roller 310 so as to form an operating projection 360, while the other end thereof is provided with a valve member 362 fixed thereto and adapted for engaging with the valve seat 354. The stem member 358 is provided at its intermediate portion with an expanded portion 363. A compression spring 364 is provided around the stem member 358 so as to act between the expanded portion 363 of the stem member 358 and the valve seat member 356, in such a manner that the compression spring 364 urges the stem member 358 upwardly as viewed in FIG. 9, i.e., radially outwardly of the suction roller 310.

The force of the compression spring 364 is so selected that the spring 364 does not allow the valve member 362 to be attracted into the suction roller 310 by the force of the internal vacuum solely but allows the valve member 358 to be attracted into the suction roller 310 thus allowing the valve unit 350 to open, when the sheet 112 has been brought onto the operating projection 360 of the stem member 358, i.e., when the sum of the force produced by the weight of the sheet 112 and the force produced by the vacuum acting on the valve member 358 is applied to the stem member 358. A packing 366 is provided between the wall of the suction hole 322 and the valve seat member 356 so as to form an airtight seal therebetween.

It is to be noted that the suction holes 322 in the suction roller 310 are arranged on lines which are inclined at a suitable angle with respect to the axis of the suction roller, so that any abrupt change in the suction force or speed of convey which may otherwise be caused due to a fact that a multiplicity of suction holes 322 are brought into and out of communication with the vacuum side.

In operation, the suction roller 310 is rotatingly driven by a known measure and the vacuum pump (not shown) is started so as to establish a vacuum inside the suction roller 310. As stated before, the valve units 350 in the suction holes 322 are kept closed until the sheet 112 is brought onto the suction roller 310.

When the sheet 112 is moved onto the suction roller 310 as indicated by arrow 114, the weight of the sheet 112 acts on the operating projections 360 of the valve units 350 projecting above the surface of the suction roller 310. In consequence, the stem member 358 is moved downward by the sum of the force produced by the weight of the sheet 112 and the force produced by the vacuum acting on the valve member 362 overcoming the force of the coiled spring 364, so that the valve member 362 is moved away from the valve seat 354 to open the valve unit 350, thus allowing the suction hole 322 to suck and attract the sheet 112, whereby the sheet 112 is conveyed at the same speed as the peripheral speed of the suction roller 310. In this state, the sheet 112 is scanned by the light beam coming from the light source 101 and oscillated by the galvanometer mirror 106.

Then, as the sheet 112 is further moved to leave the suction roller 310, the weight of the sheet 112 no more acts on the operating projections 360, so that the stem members 358 are raised by the force of the associated coiled springs 364 to bring the valve members 363 into contact with the valve seats 354. Thus, the valve units 350 are closed to cease the sucking operation.

As understood from the foregoing description, the fourth embodiment of the invention features valve units provided in the suction holes in the wall of the suction roller, the valve units being constructed to close the suction holes automatically when the associated suction holes are not participating in the operation for sucking the sheet. In consequence, the suction is conducted only through the holes underlying the sheet so that any wasteful suction if eliminated so as to ensure a high sucking efficiency. This in turn reduces the capacity of the suction device and contributes to a reduction in the capacity and size of the whole apparatus, while assuring a high stability of the convey of the sheet.

The invention has thus been shown and described with reference to specific embodiments, however, it should be noted that the invention is in no way limited to the detailed of the illustrated structure but changes and modifications may be made without departing from the scope of the appended claims.

What is claimed is:

1. An apparatus (24) for conveying a sheet member (A) by a conveyor roller having an axis perpendicular to the direction of conveyance of said sheet member, comprising:
   at least one suction roller (28) constituting said conveyor roller and having a hollow cylindrical body and a multiplicity of suction holes (40) formed in a smooth and unobstructed outer wall of said cylindrical body;
   a chamber (26) surrounding and rotatably mounting said suction roller and having a planar wall (36, 38) provided therein with at least one elongated slit (30) through which said suction holes are exposed in a region parallel to the axis of said suction roller, said suction roller being mounted in said chamber such that an uppermost surface of the roller, disposed in said slit, lies flush with said planar wall; and
   means for applying a vacuum to said exposed suction holes via said chamber, unexposed suction holes lying within the chamber, and an unobstructed interior of said hollow cylindrical body such that, upon rotation of said roller, said sheet member is conveyed over said chamber wall in a direction perpendicular to said slit and roller axis.

2. An apparatus according to claim 1, further comprising a light beam scanning unit disposed above said suction roller and adapted for scanning said sheet which is being conveyed.

* * * * *